United States Patent Office 3,186,584
Patented June 1, 1965

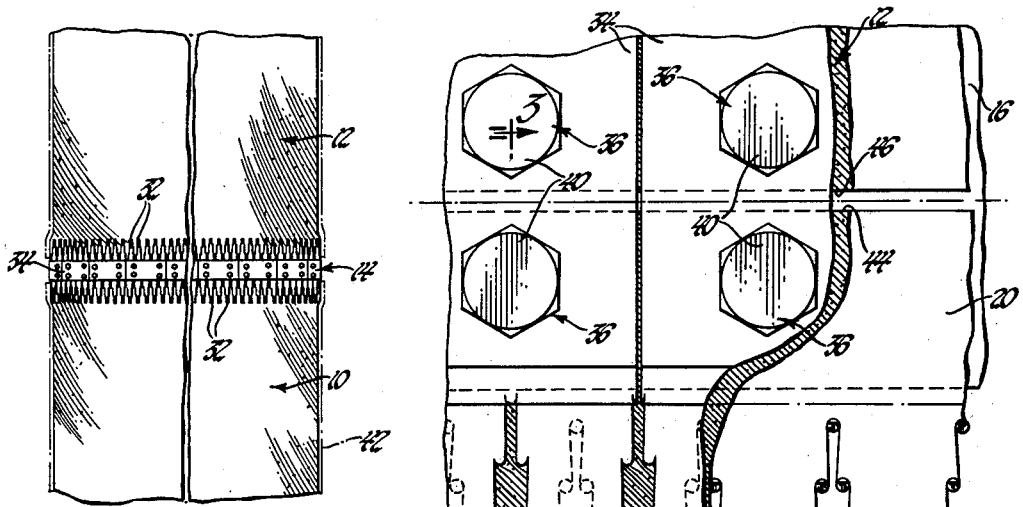

3,186,584
JOINT FOR PLASTIC ROCKET CASES
Harold Eugene Helms and Rowland L. Stedfeld, Indianapolis, Ind., assignors to General Motors Corporation, Detroit, Mich., a corporation of Delaware
Filed Apr. 22, 1963, Ser. No. 274,704
4 Claims. (Cl. 220—75)

This invention relates to connectors and, more particularly, to a connector for joining two adjacent plastic rocket engine case sections.

The state of the art of rocket engines has progressed so rapidly that larger rocket cases are continually being needed. Since current filament winding machines for rocket cases are unable to wind very large cases and because larger cases are very difficult to transport, the current solution to the problem of providing such large cases is to construct short cases and connect them together.

Therefore, it is the object of the present invention to provide an effective method of joining adjacent rocket engine case sections.

In general, the invention comprises a circumferential clamp which overlaps and penetrates both sections to be joined and secures them together. A circumferential inner coupling ring overlaps both sections and provides the inner portion of the joint. A plurality of inner finger plates, including a plurality of radially outwardly extending fingers, are spaced periodically around the circumference of the cases to be joined. A plurality of outer finger plates are located on the outside of the helical wrap portion of the rocket engine case to circumferentially align with the inner finger plates. These outer finger plates have a plurality of radially inwardly extending finger members which are located with respect to the finger members of the inner tie plates to establish an effective grasp on the case section. An outer coupling ring is circumferentially positioned to axially align and overlap with the outer finger plates. A shear pin passes through holes in the aforementioned components to hold the components together and is threadingly received within the inner coupling ring. The components thus mentioned deal with the clamping of one case, and it is to be noted that a like set of components clamp the other case and are fixed to the same inner and outer coupling rings. It is therefore the primary object of the subject invention to provide a joint for two rocket engine case sections which is an integral part of the filament winding thereof.

Other objects, features and advantages of the subject invention will become apparent upon reference to the succeeding detailed description of the invention and the drawings showing the preferred embodiment thereof, wherein:

FIGURE 1 is a side elevational view showing the subject joint connecting portions of two rocket case sections, FIGURE 2 is a cut-away view showing the relationship between the inner and outer finger members, FIGURE 3 is a sectional view of the joint taken in the direction of arrows 3—3 in FIGURE 2, and FIGURE 4 is a view of some of the components shown in FIGURE 3 before assembly.

More particularly, FIGURE 1 shows two rocket case sections 10 and 12 joined by the subject connector 14. This view is taken from the inside of the case sections and shows the inner coupling ring 16, from which it is seen the subject joint extends into both case sections 10 and 12 in the same manner. Thus, a full description of one half of the joint, that portion which extends into one case section, should be sufficient as the components of the other half are identical with those of the first half.

FIGURE 3 shows a sectional view of one half of the subject joint 14. The plane of symmetry of the joint 14 is located at 18, thus the portion above the plane (not shown) will be identical with that portion shown below the axis. The subject joint 14 then begins with an inner coupling ring 16, which overlaps both case sections 10 and 12. Located adjacent to the inner coupling ring 16 is an inner finger plate 20. The inner finger plate 20 is seen to have a plurality of finger members 22 which extend in the radially outward direction. These finger members 22 are located on triangular extensions 24 of the inner finger plate 20. As seen in FIGURE 3, the finger members extend into the helically wrapped portion 26 of the lower case section 10. Located adjacent to the outer surface of the helically wrapped portion 26 is the outer finger plate 28, which has also a plurality of finger members 30 extending into the helically wrapped portion 26. It is noted here that the finger members 30 of the outer finger plate 28 extend radially inward into the helical wrapped pattern 26. As in the case of the inner finger plate 20 the finger members 30 on the outer finger plate 28 are also located on triangular extensions 32. But as seen in FIGURE 2 these triangular sections 32 of the outer finger plate 28 are circumferentially spaced to alternate with the triangular extensions 24 of the inner tie plate 20. It is also to be noted in FIGURE 3 that the finger members 30 of the outer finger plate 28 are also varied in location in the axial direction with respect to the finger members 22 of the inner finger plate 20. This is accomplished by making the triangular portions 32 on the outer finger plate 28 slightly shorter than the corresponding triangular portions 24 on the inner finger plate 20. Thus, the finger members are staggered in both the circumferential and axial directions to provide as effective a joint member as possible.

Located adjacent to the outer finger plate 28 is the outer coupling member 34. As seen in FIGURE 4 the outer coupling ring overlaps both case sections to provide the outer portion of the joint member. Also, as seen in FIGURE 4 holes are cut through the outer coupling member 34, the outer and inner finger plates 28 and 20, and the helical wind portion 26 so that a shear pin 36 can pass therethrough to hold the aforementioned components together. The shear pin 36 has a threaded end 38 which is received by the inner coupling ring 16. The shear pin 36 also has a head 40 which may be turned by a wrench to control the tightness of the joint section.

Thus, when a larger rocket case section is desired to be made from two shorter such sections the subject invention will have its primary use. In operation each shorter case section 10 and 12 will be wound separately, incorporating the subject joint in a manner hereinafter to be described. The inner finger plate member 20 will be attached to the mandrel of the winding machine, and the helical wrapped portion 26 will be wound thereabout to the desired thickness. Then the outer finger plate 28 will be pressed up against the outer portion of the helical wrapped portion 26 so that its finger members 30 will penetrate the helical wrapped portion. A hoop winding pattern 42 will then be applied around the outside of the outer finger plate and the remainder of the rocket case such as to make the joint an integral part of the rocket case filament winding. Next the rocket case will be trimmed off at its end 44 so that it can be joined with the like surface 46 of the other section. When the two sections are brought together the inner coupling ring 16 will be placed in its overlapping position on the inside circumference of the two case members. Placed in corresponding hole alignment with the inner coupling ring 16 will be the outer coupling member 34 around the outside circumference of the outer finger plates 28. The hole through the filament wind pattern will then be drilled to match up with the corresponding holes in the other components, and the shear pin member 36 will be inserted through the subject components and threadingly received within the inner coupling ring 16 to hold the components together. This same operation will occur on the other case section such as when the two are completed, the cases will be united into one continuous longer case section.

The location of the outer and inner finger plates may be varied around the circumference of the case section and the number of them used will depend upon the size of the case section and the loads to be absorbed by the subject joint. It is to be noted that the spacing of the finger plates, if desired, could be continuous about the circumference of the case sections to provide the maximum strength in the subject joint, but this will not be necessary in most situations. The load on the joint is absorbed by both the shear pins and the finger members. This load is transferred from the reinforced plastic to the fingers by shear and bearing action. Thus, it is obvious that the angle of the fingers is important. The angle between the fingers and their finger plates should preferably be ninety degrees or less to keep them from pulling out of the reinforced plastic. In addition some of the load on the joint is transferred from the plastic through the shear pins to the coupling rings.

Although the subject invention has been illustrated in connection with its use for joining rocket engine case sections, it should be obvious to those skilled in the art to which it pertains that it would have use in any application where the joining of reinforced plastic sections is desired and that many changes and modifications may be made thereto without departing from the scope of the invention.

We claim:
1. An impregnated fiberglass case section comprising:
    an inner end ring at the inner surface and anchored to the end of said case section;
    an outer end ring on the outer surface and anchored to the end of said case section;
    spaced projections on said inner and outer end rings having fingers extending from the margins of said projections into said case section, said projections from said inner and outer end rings being relatively axially staggered;
    outer and inner coupling rings lying within and without the aforementioned rings and overlapping them;
    and radially extending pin means securing said end rings to said coupling rings.
2. A cylindrical impregnated fiberglass case section comprising:
    an inner end ring at the inner surface and anchored to the end of said case section;
    an outer end ring on the outer surface and anchored to the end of said case section;
    spaced projections on said inner and outer end rings having fingers extending from the margins of said projections into said case section, said projections from said inner and outer end rings being relatively axially staggered;
    outer and inner coupling rings lying within and without the aforementioned rings and overlapping them;
    radially extending pin means securing said end rings to said coupling rings;
    and a hoop winding of filament material around said outer end ring to cover and strengthen said case section.
3. A connection for joining two plastic sections comprising, in combination:
    an inner coupling ring providing the inner portion of said connection;
    a plurality of inner finger plates including a plurality of finger members extending in the radially outward direction, said finger plates located adjacent to the outside surface of said inner coupling ring and spaced periodically about the circumference, said plurality of finger members extending radially outward into one of said sections to be joined, one set of said finger plates extending adjacent to said one section to be joined and another set extending adjacent to said other section to be joined;
    a plurality of outer finger plates including a plurality of finger members extending in the radially inward direction, said finger plates being circumferentially spaced to line up with said inner finger plates, the pattern of said fingers on said outer finger plates being varied from that of said fingers on said inner finger plates, one set of said outer finger plates extending adjacent to said one section to be joined and another set extending adjacent to said other section to be joined such that said outer finger plates line up with said inner finger plates;
    an outer coupling ring adjacent to and overlapping said outer finger plates;
    and a plurality of pin means passing through holes in each of said sets of said outer and inner finger plates and each of said sections to be joined and threadingly received within said inner coupling ring.
4. A connection for joining two cylindrical plastic sections comprising, in combination:
    an inner coupling ring providing the inner portion of said connection;
    a plurality of inner finger plates including a plurality of finger members extending in the radially outward direction, said finger plates located adjacent to the outside surface of said inner coupling ring and spaced periodically about the circumference, said plurality of finger members extending radially outward into one of said sections to be joined, one set of said finger plates extending adjacent to said one section to be joined and another set extending adjacent to said other section to be joined;
    a plurality of outer finger plates including a plurality of finger members extending in the radially inward direction, said finger plates being circumferentially spaced to line up with said inner finger plates, the pattern of said fingers on said outer finger plates being varied from that of said fingers on said inner finger plates, one set of said outer finger plates extending adjacent to said one section to be joined and another set extending adjacent to said other section to be joined such that said outer finger plates line up with said inner finger plates;
    an outer coupling ring adjacent to and overlapping said outer finger plates;
    a plurality of pin means passing through holes in each of said sets of said outer and inner finger plates and each of said sections to be joined and threadingly received within said inner coupling ring;
    and a hoop winding of filament material around said outer finger plates to cover and strengthen said connection.

References Cited by the Examiner
UNITED STATES PATENTS

| | | | |
|---|---|---|---|
| 442,837 | 12/90 | Ward | 220—80 |
| 577,361 | 2/97 | Douglass | 24—36 |
| 2,477,855 | 8/49 | Beach | 24—33 |
| 2,793,779 | 5/57 | Woods | 220—76 |
| 3,036,728 | 5/62 | Gibb | 220—80 |

THERON E. CONDON, *Primary Examiner.*